Dec. 4, 1962  C. E. MULDER  3,066,645
AQUARIUM COVER
Filed May 5, 1960

INVENTOR
CYRUS E. MULDER
BY Price and Heneveld
ATTORNEYS

United States Patent Office 3,066,645
Patented Dec. 4, 1962

3,066,645
AQUARIUM COVER
Cyrus E. Mulder, Zeeland, Mich., assignor to Artcraft Novelty Shop, Zeeland, Mich., a corporation of Michigan
Filed May 5, 1960, Ser. No. 27,186
4 Claims. (Cl. 119—5)

This invention relates to an aquarium cover, and more particularly to an aquarium cover which can be locked in position on an aquarium.

The manufacturers of aquariums as a general rule pay little attention to exact dimensions. Therefore, aquariums may vary in length or width dimensions several fractions of an inch. This immediately presents a problem to the manufacturer of aquarium covers, since a standard aquarium cover, e.g., for a ten gallon aquarium, may or may not fit the dimensions of the aquarium. Due to the failure of the aquarium manufacturers to hold their aquariums to rather close tolerances, it is usually necessary for the purchaser of an aquarium cover to either try and spring the cover into position on the aquarium, or else shim the loose fitting aquarium cover. It is important that the aquarium cover grip the sides of the aquarium rather snugly, to prevent vibration thereof by the pumping accessory usually associated with an aquarium. Thus, if the cover fits loosely, undesirable vibration noise will result. Also, if the cover is sprung into place, the vibration may eventually cause it to loosen, and also result in undesirable noise.

The present invention is designed to solve the above-mentioned problems. This has been accomplished by providing the body of the cover with movable locking elements which can be positioned to compensate for variations in both width and length dimensions of the aquarium cover. When the locking members are properly positioned, they can be locked and the proper fit of the aquarium cover is assured.

Another undesirable feature of the aquarium covers on the market today, is that it is necessary to remove the cover and all the accessories while cleaning the aquarium tank. With the present invention, the accessories and accessory element can remain intact while the remainder of the cover is removed for cleaning purposes.

It is an object of this invention to provide an aquarium cover with locking means which compensates for variations in length and width dimensions of an aquarium.

It is still another object of this invention to provide an aquarium cover which can be securely locked onto an aquarium.

It is another object of this invention to provide an aquarium cover which has an accessory element which is detachably secured to the body of the aquarium cover.

Yet another object of this invention is to provide an aquarium cover with an accessory element which has knock-outs capable of receiving various types of heaters.

These and other objects and advantages will become more obvious upon reading the following specification in conjunction with the accompanying drawings wherein.

This invention relates basically to an aquarium cover which is particularly adaptable to width and length dimension variations of an aquarium caused by large variations in manufacturing tolerances. The cover has an elongated inverted troughlike body member which extends throughout the length of the aquarium. The exposed edges of the troughlike body are provided with outwardly extending flanges which rest on the top of the aquarium. The body is provided with end closure members which are fixed inwardly from the ends thereof. Locking members are movably secured to the end members and extended or retracted to compensate for variations in the length of the aquarium. When the locking members have been set to the proper dimension they press against the end walls of the aquarium, locking the body thereto.

The cover body has flanges which extend outwardly from each edge thereof. These flanges rest upon the top edge of the aquarium and support the body. An accessory element is detachably mounted to one of the flanges and it can be extended away from the body or moved toward the body to compensate for variations in width dimensions of the aquarium. Locking means associated with the flange and accessory element maintain the plate in position once the proper dimension is obtained. A door is pivotally secured to the other body flange, covering the remainder of the aquarium.

Figure 1:
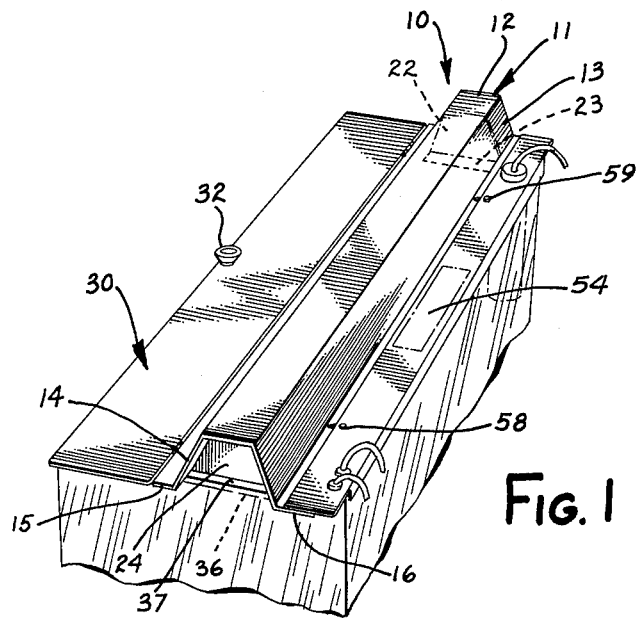
FIG. 1 is a perspective view showing the aquarium cover mounted on an aquarium.

The aquarium assembly is designated as 10 and is shown in the assembled position in FIG. 1. The assembly includes the body designated generally as 11, the end locking members designated generally as 35 and 40, the accessory element designated generally as 50, and the door designated generally as 30.

Reference is now made specifically to the body member 11. The body member 11 is a generally trough-shaped member, or inverted trough-shaped member when in the assembled position. The body 11 has a top 12 and skirts 13 and 14 which project downwardly and at an obtuse angle to the top 12.

Formed integral with the skirt 13 is an outwardly projecting accessory flange 16. The accessory flange 16 extends throughout the longitudinal length of the body 11, and is of substantial width. The edge of the flange is provided with a pair of spaced slots 18 and 19 which open onto the exposed edge of the flange to accept the detachable members of the accessory element 50 in a manner to be described more fully subsequently. The accessory flange 60 is also provided with accessory reliefs 20 and 21 in the outer edge thereof, and a heater accessory relief knock-out 29 for purposes which will be fully explained in the operation and assembly of the cover.

A door flange 15 is formed integral with the skirt 14 and projects outwardly therefrom. The door flange 15 also extends throughout the longitudinal length of the body 11 and is of substantial width. As shown in FIG. 1, the rear flange 15 and accessory flanges 16 rest upon the end edges of the aquarium and support the body 11 thereover. The outer edge of door flange 15 is turned under to form a rib 17 (FIG. 2) which lends strength to the flange.

The ends of the troughlike body member 11 are closed by end members 22 and 24 which are set in from the end edges of the body 11 and are secured thereto by appropriate fastening means such as welding. The end member 22 has a transversely extending inwardly projecting foot 23. The foot 23 lies in approximately the same plane as the accessory flange 16 and door flange 15. It has a threaded aperture which is adapted to receive a fastener 44. The foot 23 is normally provided with some type of a nut, such as a speed nut stamped therein or a conventional nut welded thereto which also receives fastener 44 (not shown). The fastener 44 cooperates with a lock member 40 in a manner to be explained subsequently.

The end member 24 has a foot 25 which extends transversely from the bottom edge thereof. The foot 25 is also substantially in the same plane as accessory flange 16 and door flange 15. A foot 25 is provided with a nut (no shown) in a manner similar to the foot 23 and has a fastener 39 which is screwed therein. The fastener 39 cooperates with the end member 35 now to be described.

The lock member 35 is generally L-shaped, having transverse legs 36 and 37. The transverse leg 37 has a slot 38 which opens upon the exposed edge thereof. The leg 37 is of approximately the same dimension as foot 25 and is slidably mounted upon the foot 25. The slot 38 is located so as to straddle the fastener 39. The leg 36 is adapted to engage a surface of the aquarium. The lock member 35 can be extended or retracted with respect to the end 24 and locked in any position by the fastener 39.

A generally L-shaped lock member 40 associates with the foot 23 in a manner similar to the way slide 35 associates with foot 25. The lock member 40 has transverse legs 41 and 42 and the leg 41 has a slot 43 which straddles the fastener 44. The leg 42 is adapted to abut against an interior surface of the aquarium opposite to that engaged by leg 36.

An elongated generally rectangular door 30 is pivotally secured to the door flange 15 by spaced hinges 33. The side edges of the door 30 are turned under to form stays 31 which add strength to the door. A handle 32 is secured to the outer edge of the door 30 to provide a means of lifting the door to feed aquatic life. The door 30 is of substantially the same length as the cover body 11.

The accessory element 50 is the same length as the cover body 11. The element 50 has a plate portion 51 which is of substantial width. The edge of the accessory plate 51 is turned down forming a lip 52. The lip 52 acts as a locking member and also strengthens the plate 51. The plate 51 is provided with a heater aperture 53 at one end thereof and apertures 55 for accommodating elements of a pump. Centrally disposed in the plate 51 is a metal knock-out 54. If the user desires, he may punch out the metal knock-out 54 and place a larger square type heater on the accessory plate rather than using the smaller heater aperture 53. If the larger heater is used, the knock-out 29 must also be removed from accessory flange 16.

The anchor element 50 is detachably secured to the accessory flange 16 of body 11 by step-shaped anchor brackets 56, 57 and fasteners 58 and 59 associated respectively therewith. The fasteners 58 and 59 are screwed into nuts 60 and 61 secured to the respective anchor brackets 56 and 57. These nuts may be of the speed nut variety and stamped or molded into the anchor brackets, or may be conventional type and welded to the brackets. The fasteners 58 and 59 pass through the plate 51 and are positioned along the plate 51 so that they align with slots 19 and 18, respectively, formed in the edge of accessory flange 16. The slots 18 and 19 straddle the fasteners 59 and 58, respectively, and allow relative movement of the body 11 with respect to the accessory element 50.

As shown in FIG. 1, the accessory element 50 is mounted so that the lip 52 surrounds the outer upper edge of the aquarium. However, it is to be understood that the accessory element 50 may be mounted so that the lip 52 abuts the interior of the side edge of the aquarium. The operation of the fasteners 58 and 59 in the slots 18 and 19 allows relative movement between the accessory element and the body 11 to compensate for variations in width dimension of the aquarium.

Figure 2:
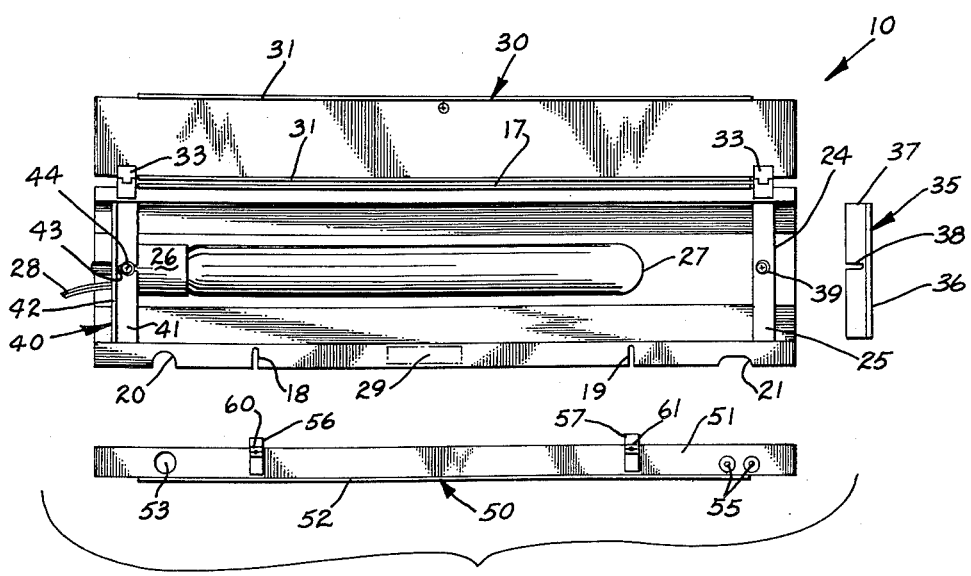
FIG. 2 is a plan view of the bottom of the aquarium cover showing one of the end locking members and the accessory plate in an exploded manner.

A light socket 26 is secured to the end member 23 and projects into the body 11. FIG. 2 shows a bulb 27 installed in the socket 26 and lying within the body 11. On larger sized aquarium covers, it may be desirable to also provide the end member 24 with a socket to support a light bulb. An aperture in the end member 22 allows a cord 28 to lead from the socket 26 to a proper electrical receptacle.

Assembly and Operation

The aquarium cover assembly 10 is fully assembled by the manufacturer and is ready for installation upon receipt by the purchaser.

The initial steps in installing the aquarium cover assembly on an aquarium is to loosen the fasteners 39, 44, 58 and 59. The exact length dimension of the aquarium interior is then measured. The locking members 35 and 40 are then extended or retracted as necessary to conform to this exact dimension. The fasteners 39 and 44 are then tightened securing the lock members 35 and 40 in the proper position. The aquarium cover assembly 10 is then placed in position on the aquarium and the lock members 35 and 40 will abut the ends of the aquarium and the aquarium cover assembly 10 will be locked into position longitudinally.

The accessory element 50 is then extended or retracted as necessary to cause the lip 52 to engage the side edge of the aquarium and compensate for any variations in the width dimension of the aquarium. Also, the lip 50 will lock the aquarium cover assembly 10 into position against transverse movement.

The pump, heaters, and other accessories can then be mounted on the accessory plate 50 or this may be done initially before the aquarium cover assembly is mounted on the aquarium.

If it is desired to clean the aquarium after a given period of use, it is only necessary to loosen the fasteners 58 and 59 and slide the body 11 and door 30 forward out of contact with the accessory element 50. The body 11 and door 30 can then be lifted vertically and removed completely from the accessory element 50. This operation is illustrated by the positioning of accessory element 50 and the body 11 and door 30 as shown in FIG. 2. In this manner the aquarium may be cleaned without disconnecting the pump, heater, and other accessories secured to the accessory element. After cleaning, the body 11 and door 30 are again placed in position and the fasteners 58 and 59 are tightened.

The pivotally mounted door 30 also provides a means for feeding aquatic life without the necessity of removing the entire aquarium cover.

It can be seen that the invention disclosed herein provides a highly desirable aquarium cover. The cover is adaptable to fit aquariums having large variations in width and length dimensions. The aquarium cover can also be locked in position on the aquarium so as to prevent longitudinal or transverse movement of the cover. This locking feature prevents undesirable vibration noises which might otherwise develop from the operation of the accessories. The cover can be made entirely from corrosion resistant materials such as stainless steel or plastics.

While a preferred embodiment of this invention has been described, it will be understood that modifications and improvements may be made thereto. Such of these modifications and improvements as incorporate the principles of this invention are to be considered as included in the hereinafter appended claims unless these claims by their language expressly state otherwise.

I claim:

1. An aquarium cover comprising: a cover having body means, said body means having an inverted troughlike shape with closing end members, locking means movably secured to said end members and adapted to engage the ends of an aquarium for locking said body means thereto and for compensating for length variations in said aquarium, said body means having outwardly extending flanges adapted to rest on the top of said aquarium, and said locking means cooperating with said end members and body means to form a dust barrier in any position thereof; a door pivotally mounted to one of said flange members wherein aquatic life may be fed without removing said cover means, and accessory element means movably secured to said other flange and adapted to engage the side of said aquarium for locking said body means thereto and for compensating for width variations of said aquarium, said accessory element means cooperating with said other flange to form a dust barrier in any of its positions.

2. An aquarium cover as in claim 1 wherein said accessory element has knock-out means for installing a heater.

3. An aquarium cover as in claim 1 wherein said accessory element has detachable means associated with said other flange whereby said body means may be removed from said aquarium for cleaning purposes without disturbing said accessory element or accessories.

4. An aquarium cover comprising: a cover having body means, said body means having an inverted troughlike shape with closing end members, locking means movably secured to said end members and adapted to engage the ends of an aquarium for locking said body means thereto and for compensating for length variations in said aquarium, said locking means including angle shaped locking members including legs of a length equal to the maximum width of said trough, certain of said legs having slots cooperating with fasteners in said end members whereby said locking members can be moved and locked, said body means having outwardly extending flanges adapted to rest on the top of said aquarium; a door pivotally mounted to one of said flange members wherein aquatic life may be fed without removing said cover means, and accessory element means of a length at least as great as the maximum length of said aquarium movably secured to said other flange and adapted to engage the side of said aquarium for locking said body means thereto and for compensating in width variations of said aquarium; said accessory plate means including fastener means and said other flange slot means whereby said body means and accessory plate means may be moved with respect to each other and locked.

References Cited in the file of this patent
UNITED STATES PATENTS

| 1,209,582 | Hoernegel | Dec. 19, 1916 |
| 2,776,642 | Sepersky | Jan. 8, 1957 |